United States Patent [19]
Lin

[11] Patent Number: 5,330,022
[45] Date of Patent: Jul. 19, 1994

[54] FRONT WHEEL STEERING MECHANISM FOR ELECTRO MOBILE

[76] Inventor: Yu-Shu Lin, 7F, No. 2-1, Lane 130, Shing-Yi Road, Pei Tou, Taipei, Taiwan

[21] Appl. No.: 74,042

[22] Filed: Jun. 8, 1993

[51] Int. Cl.[5] .............................................. B62D 9/00
[52] U.S. Cl. .................................... 180/79.3; 280/95.1
[58] Field of Search ...................... 180/79.4, 79.3, 79; 280/93, 94, 95.1, 846, 268

[56] References Cited

U.S. PATENT DOCUMENTS

| | | | |
|---|---|---|---|
| 1,223,913 | 4/1917 | Weaver | 280/94 X |
| 1,284,179 | 11/1918 | Coombs | 280/94 |
| 1,766,506 | 6/1930 | Delpini | 280/94 X |
| 2,169,969 | 8/1939 | Allison | 280/94 X |
| 2,589,679 | 3/1952 | Dennesen | 280/94 X |
| 3,051,257 | 8/1962 | Selle | 280/94 X |
| 3,695,628 | 10/1972 | Fisher | 280/94 X |
| 3,833,235 | 9/1974 | Worsham | 280/94 |
| 3,848,885 | 11/1974 | Hefren | 280/94 |

*Primary Examiner*—Richard M. Camby
*Assistant Examiner*—Florian Zeender
*Attorney, Agent, or Firm*—W. Wayne Liauh

[57] ABSTRACT

An agile and highly stable auto-reversing front wheel steering mechanism. Its main components include a chassis, a steering shaft, a pair of front wheels, a connecting rod, front axle end beams, steering pitch axles, king pins, and transversal pulling rods. It uses the steering shaft to turn the steering pitch axles, which then turn the two wheels through the transversal pulling rod so that the turning of an electra mobile can be agile and highly stable and an auto-reversing, by which the steering shaft will return to its original forward position after making a turn, can be achieved.

5 Claims, 9 Drawing Sheets 5,330,022

FRONT WHEEL STEERING MECHANISM FOR ELECTRO MOBILE

FIELD OF THE INVENTION

This invention relates to an agile and highly stable auto-reverse front wheel steering mechanism for electro mobile.

BACKGROUND OF THE INVENTION

Electro mobile is a very convenient device in helping old people and the handicapped with their transportation need. But since these people are usually physically weak or partially disabled, it is therefore important that the steering mechanism of the electro mobile be light and easy to handle and it should be safe and stable. To be more specific, the steering mechanism for the electro mobile should include:
1. Agility: Since the handicapped and old people are usually having more difficulties than regular people in moving their limbs, the steering mechanism should therefore be light and easy to manipulate.
2. Stability: The electro mobile should not be swaying during straight line movement so that the driver need not place their hands on steering shaft all the time.
3. Auto-reverse: The steering shaft must be able to return to its original forward position after turning to save efforts required of driver.

Based upon the above requirements, the inventor has developed the present invention through unrelenting researches and experiments.

DETAILED DESCRIPTION OF FIGURES

Figure 1:
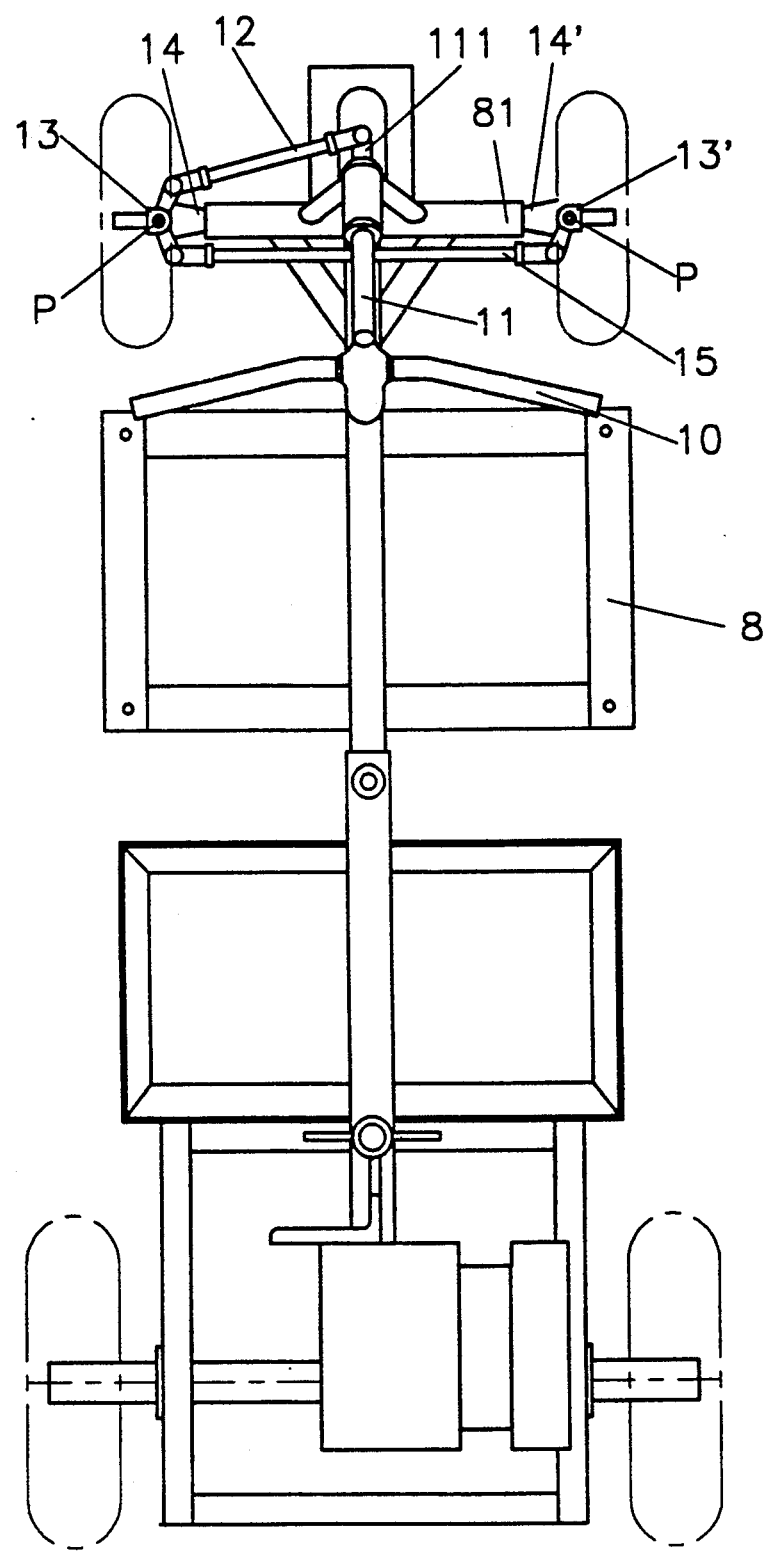
FIG. 1 shows the top view of the chassis of this invention.
Figure 2:
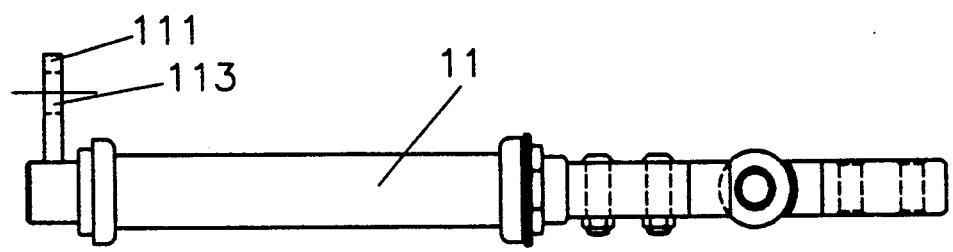
FIG. 2 shows the front view of the steering axle of this invention.

As shown in FIG. 1, this invention is composed of the chassis (8), steering shaft (10), connecting rod (12), left and right end beams of front axle (14, 14'), left and right steering pitch axles (13, 13'), king pin (P), and the transversal pulling rod (15). By using the steering shaft (11) to move the connecting rod (12) and by moving the transversal pulling rod (15) to turn the two front wheels, the agility and high stability can thus be achieved. The following is a detailed description of each figure:

As shown in FIG. 1 and FIG. 2, the chassis 8 is the bottom support for the electro mobile. There is a transversal axle (81) located in its front end and there is a steering shaft (11) located at its center where it can be turned. Underneath the steering shaft (11) is a rocking arm (111) which contains a locking hole (113) that can be used to connect the connecting rod (12) to control the turning of front wheels.

Figure 3:
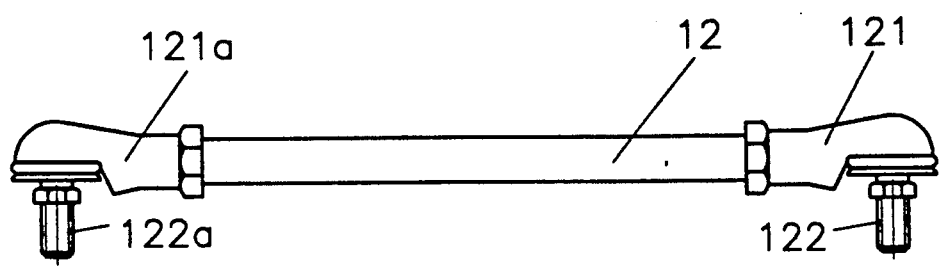
FIG. 3 shows the front view of the connecting rod of this invention.
Figure 4:
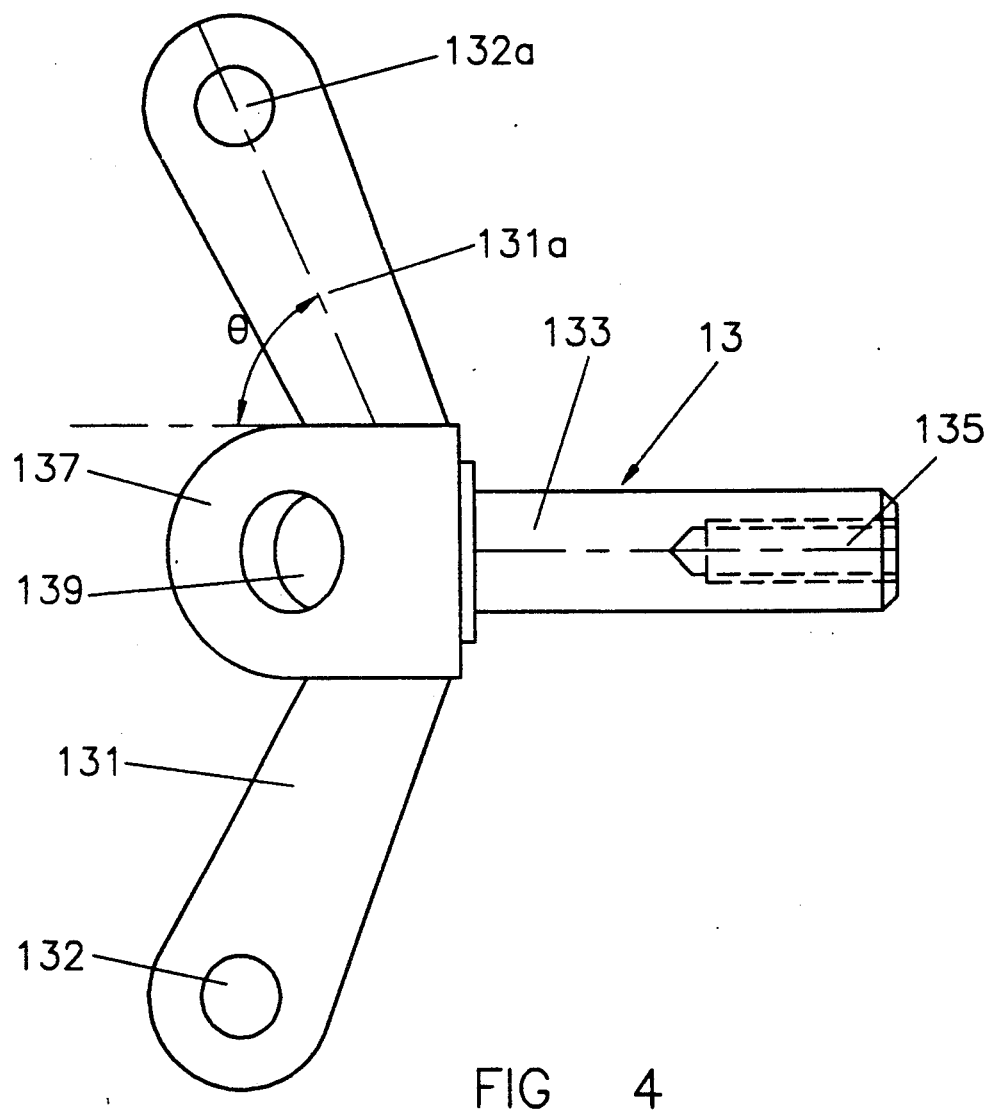
FIG. 4 shows the top view of the steering pitch axle of the left axle of this invention.

As shown in FIG. 3 and FIG. 4, the two ends of connecting rod (12) are connected to ball joints (121, 121a). Each ball joint comes with a screw rod (122, 122a) that can be locked into the locking hole (113) of the rocker arm (111) and the locking hole (132) of the connecting rod arm (131).

Figure 5:
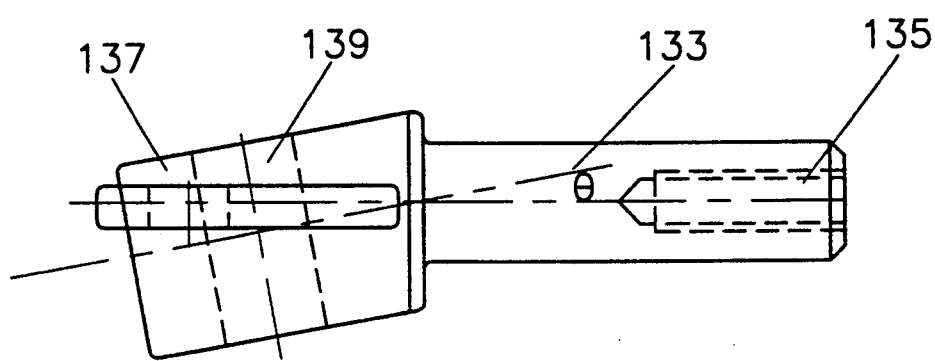
FIG. 5 shows the side view of the steering pitch axle of the left axle of this invention.

As shown in FIG. 4 and FIG. 5, there is an axle rod (133) on one end of the left steering pitch axle (13). On one end of the axle rod (133) is a tap hole (135) which can be joined to the center of the tire with a screw bolt. On the other end of the axle rod (133) is a joint section (137) that contains a steering axle hole (139) which lines up with the joint section (137) at a tilt angle Θ whose value is about 9.5°. The tilt angle Θ forms between the joint section (137) and the transversal pulling rod arm (131a) and between the joint section (137) and the steering pitch arm (131) is 65°. The joint section (137) is also connected to the left end beam of the front axle (14).

Figure 6:
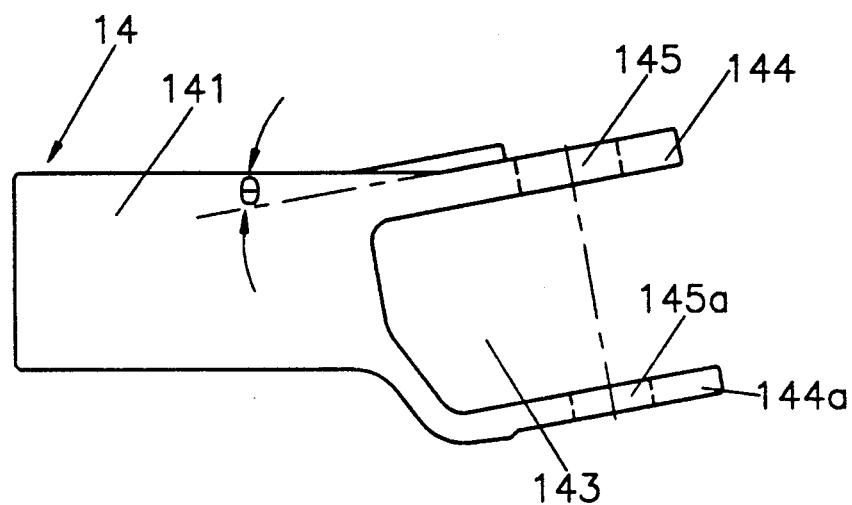
FIG. 6 shows the side view of the end beam of the front axle of this invention.
Figure 7:
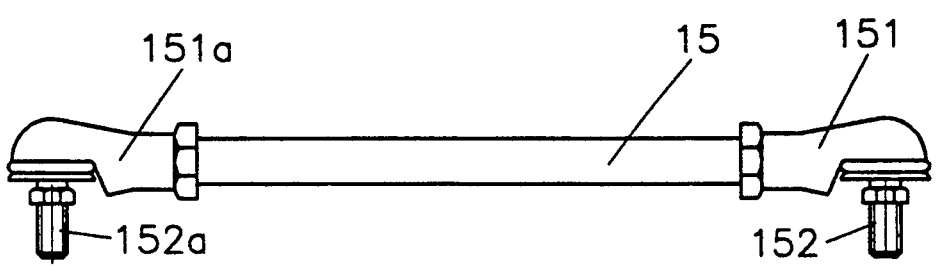
FIG. 7 shows the front view of the transversal pulling rod of this invention.

As shown in FIG. 6, the "h" shape front axle end beams (14, 14a) are attached to the two sides of the transverse axle 81. There are two tongues (144, 144a) located on each side of the end beam of the front axle (14) and they form a tilt angle Θ (Θ value is at about 9.5°) with the end beam of front axle (14) and there is a room (143) formed between two tongues (144, 144a). On each tongue there is a pin hole (145, 145a) which allows the steering pitch axle (13) to be inserted into the room (143) and a king pin (P) (as shown in FIG. 7) can be used to run through the steering pitch axle (13) and the two pin holes (145, 145a) on the end beams of the front axle (14). The steering pitch axles (13, 13') can then be jointed to the transverse pulling rod (15).

As shown in FIG. 7, on each end of the transversal pulling rod (15) there is a ball joint (151, 151a) each with a screw rod (152, 152a) that can be locked into the locking holes (132a, 132a') located on pulling arms of the left and right steering pitch axle to turn the wheels. The following is a description on how to assemble this invention.

When assemblying this invention, the front axle end beams (14, 14') should be placed by the two ends of the transversal axle (81), and a king pin (P) is used to run through the pin holes 145, 139, and 145a located on the left and right front axle end beams (14, 14') and the pin holes 145', 139', and 145a' located on the left and right steering pitch axle (13, 13') to fix them; the two ball joints (121, 121a) located on each end of the connecting rod (12) should be fixed on the rocker arm (111) and the left steering pitch axle (131), respectively; and the ball joints (151, 151a) located on each end of the transversal pulling rod (15) are fixed on the locking hole (132a) on the transversal pulling rod (131a) and the locking hole (132a') on the transversal rod (132a), respectively. In addition, the positions of the left and right steering pitch axle (13, 13') can be interchanged to allow connection of connecting rod (12) and the right side of the steering pitch axle to achieve the same effect.

When making turn by using this invention, the steering shaft (11) is turned to move the rocker arm (111) which in turn moves the connecting rod (12) to drive the connecting rod arm (131) located on the left steering pitch axle (13) to turn the left wheel. Since the left steering pitch axle (13) is loosely connected to the front axle end beam (14) on the transversal axle (81) and the transversal pulling rod (15) is connected to the transversal pulling rod arms (131a, 131a') of the left and right steering pitch axles (13, 13'), the right wheel is therefore turned in the same direction as that of the left wheel and thus complete the turning of the electro mobile.

Figure 8:
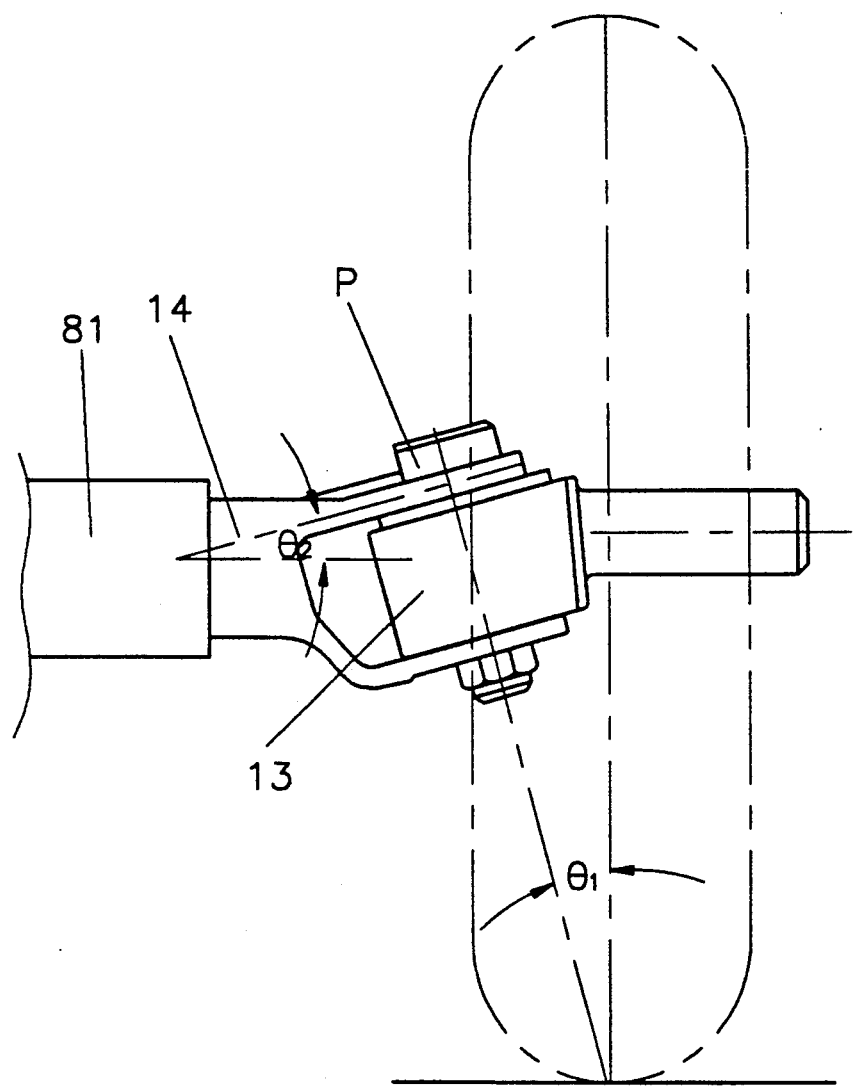
FIG. 8 shows the center lines of the steering pitch axle and end beam of front axle in relation to the tire and the ground.

This invention has the following advantages during the operation:

1. As shown in FIG. 8, the left and right wheel axle end beams (14, 14') and the left and right steering pitch axles (13, 13') form a tilt angle Θ which makes the center lines of the pin holes 145, 145a, 139, 145', 145a', and 139' located on the left and right wheel axle end beams (14, 14') and the left and right steering pitch axle (13, 13') to intercept with the perpendicular lines form between the left and right tires and the ground so that the mobile will turn about the intercepting point without generating component of momentum so that the agile turning can be done.

Figure 9:
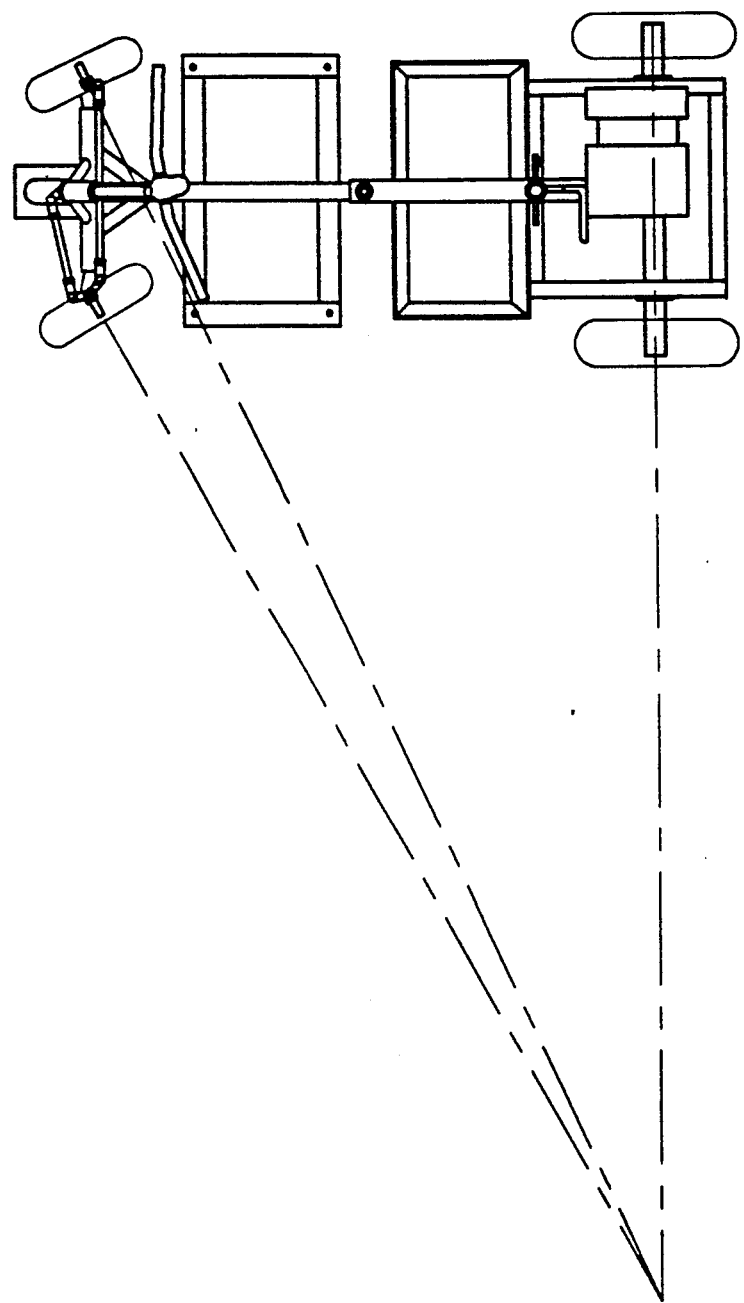
FIG. 9 shows the instantaneous center of this invention while it is turning.

2. As shown in FIG. 9, the special angle (about 65°) designed for the connecting rod arm (131) and the transversal pulling rod arm (131a) on the two sides of the steering pitch axle (13) makes the perpendicular lines of the two tires intercept with each other at one point and also intercept with the extension line of the rear wheel axle at one point so that the gyration diameter can be reduced to provide fast turning.

3. Since the steering shaft (11), the connecting rod (12), and the transversal pulling rod (15) are located right above the chassis, the height of the chassis is therefore reduced so that the danger of steering shaft (11), connecting rod (12), and the transversal pulling rod (15) hitting any object on ground surface can be avoided.

4. As shown in FIG. 8, the left and right wheel axle end beams (14, 14') and the left and right steering pitch axles (13, 13') both form a horizontal angle Θ2 of about 9.5° which can generate the reversing torque for the two front wheels after turning and therefore enables the implementation of auto-reverse function.

What is claimed is:

1. An electric vehicle having an electro mobile front wheel steering mechanism comprising:

a chassis as a bottom support for the electric vehicle, said chassis containing a transversal axle having first and second sides;

a turnable steering shaft located at a central position of the transversal axle said steering shaft containing a rocker arm; and a pair of wheels mounted on the first and second sides of the transversal axle, respectively, the improvement being characterized in that said wheel steering mechanism further comprising:

a pair of h-shaped first and second wheel axle end beams fixed on the first and second sides, respectively, of the transversal axle, each wheel axle end beam containing a pair of tongues at one end thereof, both tongues being tilted at a first tilt angle relative to the wheel axle end beam, each tongue containing a pin hole, and a room being provided between the pair of tongues;

a connecting rod being adapted to be connected to the rocker arm of the steering shaft at one end thereof;

a Y-shaped first steering pitch axle including a first axle end and a first joint section for inserting into the room formed between the pair of tongues at one end of the first wheel axle end beam; the first joint section having a top surface and two sides and a first steering axle hole, said first steering axle hole having an axis normal to the top surface of the first joint section, said first joint section being at a second tilt angle relative to the first axle end;

a connecting rod arm and a first transversal pulling rod arm located at respective sides of the first joint section; the connecting rod arm containing a first pin hole and the first transversal pulling rod arm containing a second pin hole;

an obtuse angularly shaped second steering pitch axle including a second axle end and a second joint section for inserting into the room formed between the pair of tongues at one end of the second wheel axle end beam; the second joint section having a top surface and two sides and a second steering axle hole; said second steering axle hole having an axis normal to the top surface of the second joint section, said second joint section being at the second tilt angle relative to the second axle end; the second joint section being connected to a second transversal pulling rod arm on one side thereof, the second transversal pulling rod arm containing a third pin hole which is located in a comparable position with respect to the second pin hole located on the first transversal pulling rod arm; and a transversal pulling rod that connects to the first and second transversal pulling rod arms at the second and third pin holes, respectively.

2. The electro mobile front wheel steering mechanism according to claim 1, wherein the first tilt angle between the pair of tongues and the first and second wheel axle end beams is about 9.5 °.

3. The electro mobile front wheel steering mechanism according to claim 1, wherein the second tilt angle between the first joint section and the first axle end of the first steering pitch axle is about 9.5°.

4. The electro mobile front wheel steering mechanism according to claim 1, wherein the connecting rod arm and the first transversal pulling rod arm are located on the respective sides of the first joint section at an angle of about 65° with respect to the first axle end of the first steering pitch axle.

5. The electro mobile front wheel steering mechanism according to claim 1, wherein the second transversal pulling rod arm is located on one side of the second joint section at an angle of 65° with respect to the second axle end of the second steering pitch axle.

* * * * *